(12) United States Patent
Yatsuda et al.

(10) Patent No.: US 8,325,158 B2
(45) Date of Patent: Dec. 4, 2012

(54) OPTICAL WAVEGUIDE, OPTICAL WAVEGUIDE TYPE TOUCH PANEL AND METHOD OF MANUFACTURING THE OPTICAL WAVEGUIDE

(75) Inventors: Kazutoshi Yatsuda, Kanagawa (JP); Masahiro Igusa, Kanagawa (JP); Akira Fujii, Kanagawa (JP); Toshihiko Suzuki, Kanagawa (JP); Keishi Shimizu, Kanagawa (JP); Shigemi Ohtsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 684 days.

(21) Appl. No.: 12/502,583

(22) Filed: Jul. 14, 2009

(65) Prior Publication Data

US 2010/0156848 A1    Jun. 24, 2010

(30) Foreign Application Priority Data

Dec. 24, 2008   (JP) ................................. 2008-328456

(51) Int. Cl.
  *G06F 3/042* (2006.01)
  *G09G 3/36* (2006.01)
(52) U.S. Cl. ............................ 345/176; 345/87; 385/131
(58) Field of Classification Search ........................ None
  See application file for complete search history.

(56) References Cited

U.S. PATENT DOCUMENTS

| | | | |
|---|---|---|---|
| 5,659,332 A | 8/1997 | Ishii et al. | |
| 8,009,944 B2 * | 8/2011 | Shimizu | 385/32 |
| 2009/0122027 A1 * | 5/2009 | Newton | 345/175 |
| 2009/0237375 A1 * | 9/2009 | Khan et al. | 345/175 |

FOREIGN PATENT DOCUMENTS

| | | |
|---|---|---|
| JP | A-05-334000 | 12/1993 |
| JP | A-2005-107804 | 4/2005 |
| JP | A-2008-186374 | 8/2008 |

* cited by examiner

*Primary Examiner* — Andrew L Sniezek
(74) *Attorney, Agent, or Firm* — Oliff & Berridge, PLC

(57) ABSTRACT

A method of manufacturing an optical waveguide includes forming a core layer on a first clad layer, forming a second clad layer on the core layer, forming a first groove including at least one inclined surface in the second clad layer and the core layer to be in substantially parallel to and near one end of the second clad layer and one end of the core layer, the at least one inclined surface of the first groove having such an angle that the core layer is exposed when viewed above the second clad layer, forming a second groove including at least one inclined surface in the second clad layer on a inner side of the first groove, forming a separation groove in the clad layers and the core layer in a direction intersecting the first groove, and forming a plurality of cores intersecting the first groove.

6 Claims, 9 Drawing Sheets

OPTICAL WAVEGUIDE, OPTICAL WAVEGUIDE TYPE TOUCH PANEL AND METHOD OF MANUFACTURING THE OPTICAL WAVEGUIDE

CROSS-REFERENCE TO RELATED APPLICATIONS

This application is based on and claims priority under 35 USC 119 from Japanese Patent Application No. 2008-328456 filed on Dec. 24, 2008.

BACKGROUND

Technical Field

The present invention relates to an optical waveguide, an optical waveguide type touch panel and a method of manufacturing the optical waveguide.

SUMMARY

According to an aspect of the invention, an optical waveguide includes a clad, a plurality of first cores, a plurality of first reflecting surfaces and a plurality of third reflecting surfaces. The clad has a first surface and second surface which is opposed to the first surface. The clad is plate-like. The plurality of first cores is provided in a first layer in the clad. Each of the plurality of first reflecting surfaces is provided in one end of a corresponding one of the first cores. Each first reflecting surface reflects light being incident from the second surface, so as to propagate the light through the first core. Each of the plurality of third reflecting surfaces reflects light going out of a corresponding one of the first cores and propagating through the clad among the light reflected by the first reflecting surface, toward a direction different from an axial direction of the corresponding one of the first cores.

BRIEF DESCRIPTION OF THE DRAWINGS

Exemplary embodiments of the invention will be described below in detail based on the accompanying drawings, wherein:

FIGS. 6A, 6C, 6E, 6G and 6I are plane views, FIG. 6B is a section view taken along a line VIB-VIB in FIG. 6A, FIG. 6D is a section view taken along a line VID-VID in FIG. 6C, FIG. 6F is a section view taken along a line VIF-VIF in FIG. 6E, FIG. 6H is a section view taken along a line VIH-VIH in FIG. 6G and FIG. 6J is a section view taken along a line VIJ-VIJ in FIG. 6I;

DETAILED DESCRIPTION

First Exemplary Embodiment

Figure 1:
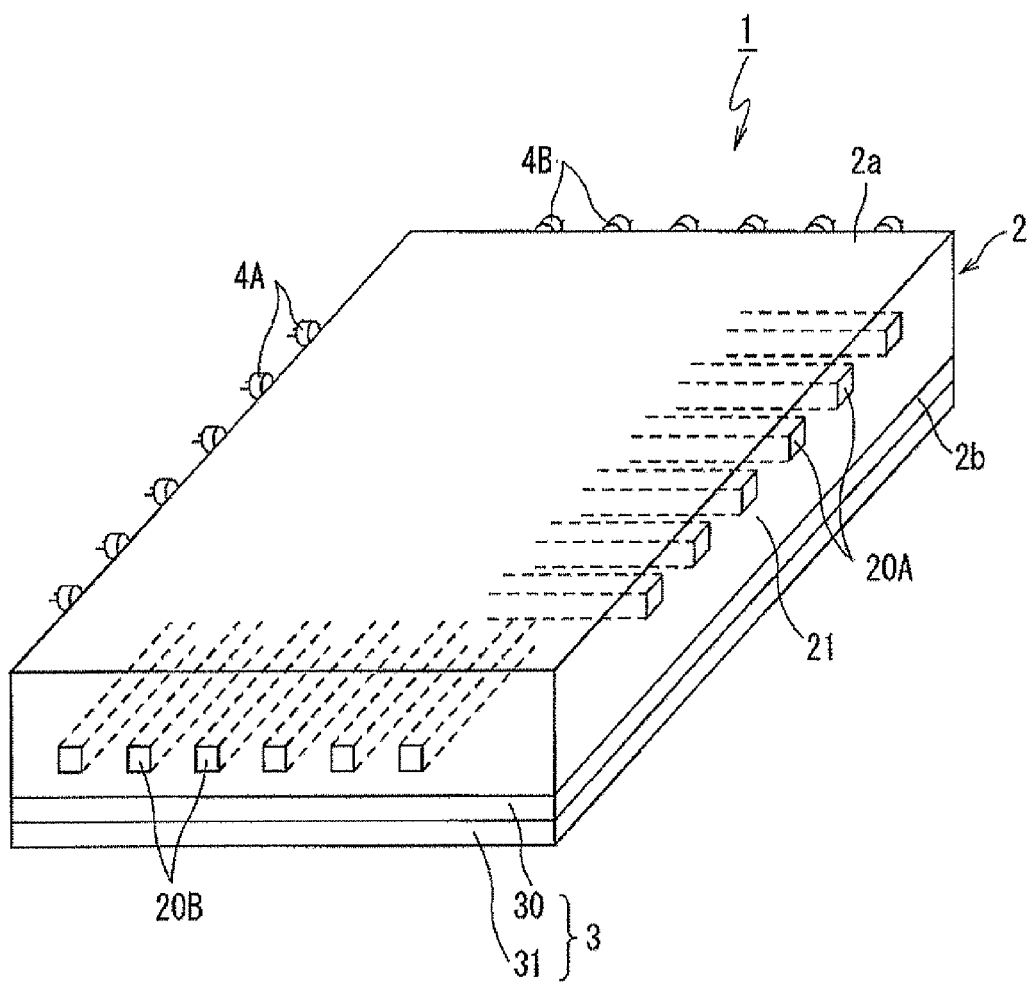
FIG. 1 is a schematic perspective view showing the configuration of an optical waveguide type touch panel according to an exemplary embodiment of the present invention.

FIG. 1 is a schematic perspective view showing the configuration of an optical waveguide type touch panel according to an exemplary embodiment of the present invention. Reflecting surfaces are not shown in this figure.

An optical waveguide type touch panel 1 includes an optical waveguide 2, a display 3, plural first light receiving elements 4A and plural second light receiving elements 4B. The optical waveguide 2 has plural first cores 20A and plural second cores 20B which intersect each other. The first and second cores 20A and 20B are formed on different layers in a plate-like clad 21 having a surface (front surface) 2a to be pressed. The display 3 is formed in a rear surface 2b of the optical waveguide 2. Thee first and second light receiving elements 4A and 4B are formed at one ends of the plural first and second cores 20A and 20B of the optical waveguide 2.

The display 3 includes a liquid crystal panel 30 which displays an image, and a backlight 31 which illuminates the liquid crystal panel 30 from the rear side.

(Configuration of Optical Waveguide)

A numerical aperture defined by reflective indices of the respective cores 20A and 20B and a refractive index of the clad 21 of the optical waveguide 2 is in a range of 0.01 to 0.2, preferably in a range of 0.01 to 0.1, in order to facilitate leakage of propagating light by deforming the cores 20A and 20B when they are pressed.

The optical waveguide 2 has flexibility of Hs40 or less, preferably Hs20 or less, in hardness defined by JIS K 6301, in order to facilitate deformation of the cores 20A and 20B. Thus, the cores 20A and 20B and the clad 21 are made of a polymer material such as epoxy resin.

Figure 2:
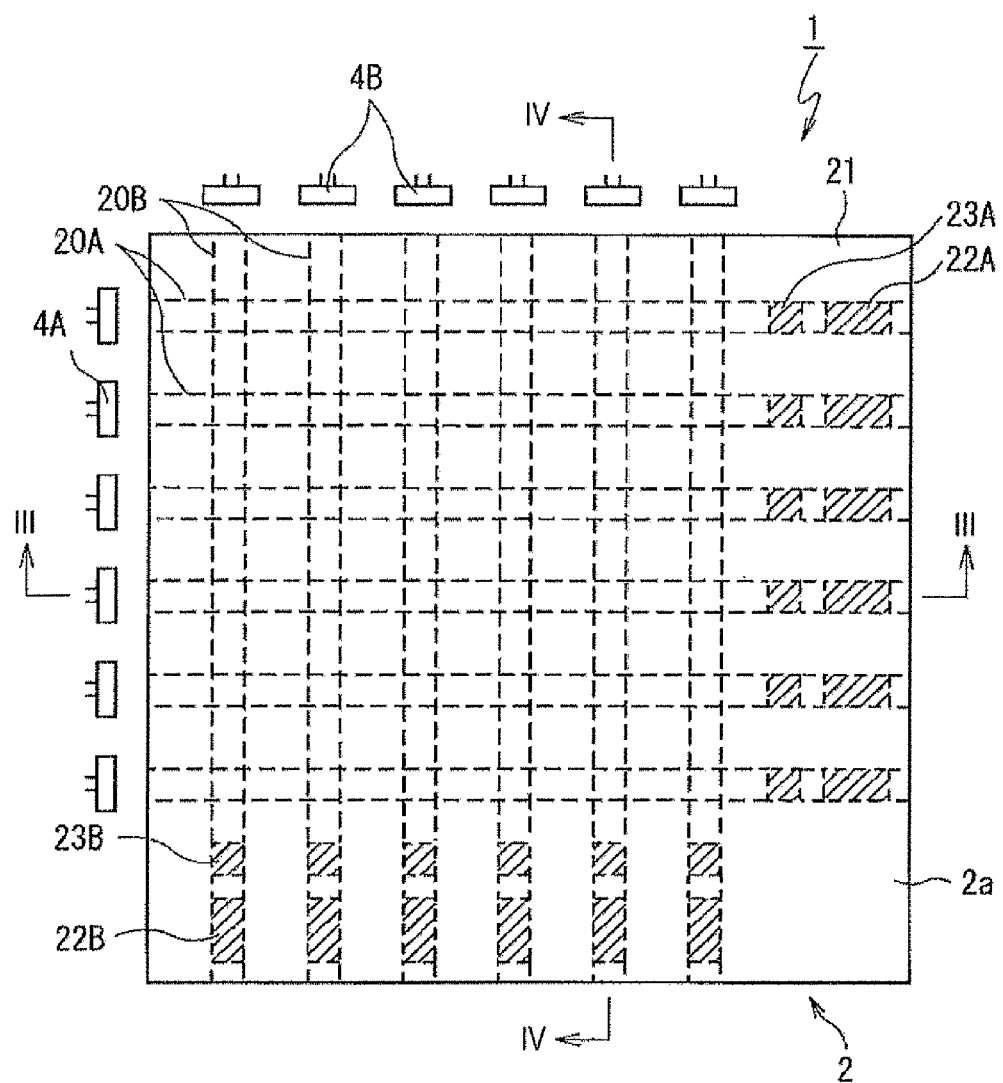
FIG. 2 is a plan view of the optical waveguide type touch panel.
Figure 3:
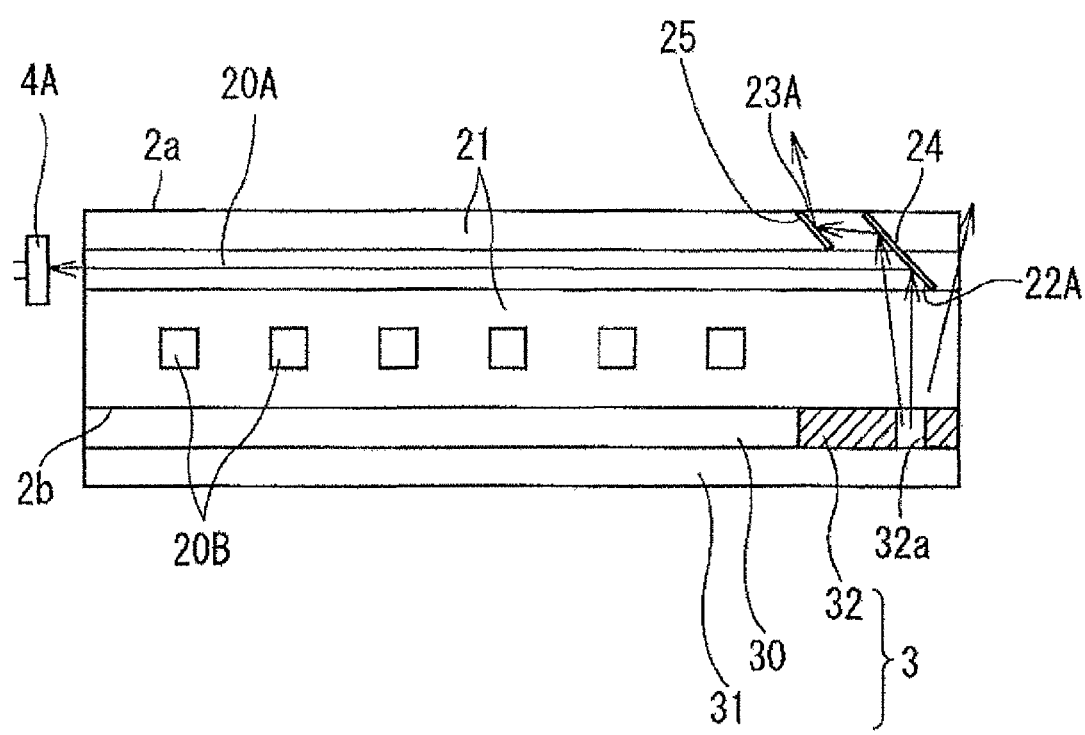
FIG. 3 is a sectional view taken along line III-III of FIG. 2.
Figure 4:
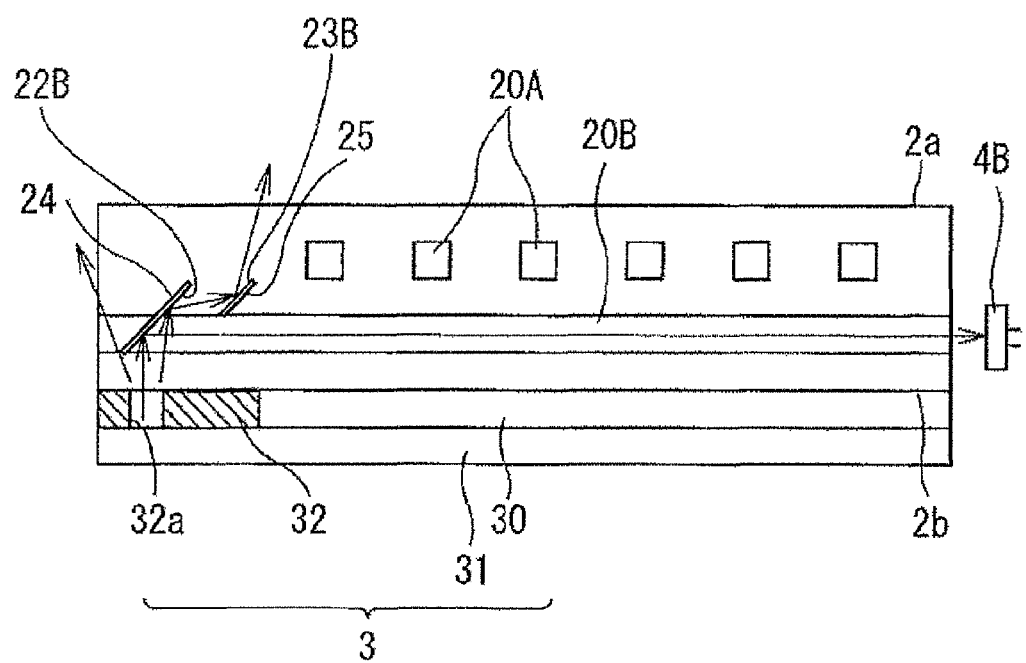
FIG. 4 is a sectional view taken along line IV-IV of FIG. 2.

FIG. 2 is a plan view of the optical waveguide type touch panel 1, FIG. 3 is a sectional view taken along line III-III of FIG. 2, and FIG. 4 is a sectional view taken along line IV-IV of FIG. 2.

As shown in FIGS. 2 and 3, the optical waveguide 2 includes plural first reflecting surfaces 22A and plural third reflecting surfaces 23A. The plural first reflecting surfaces 22A are provided at ends on the opposite side to the first light receiving elements 4A of the plural first cores 20A. The plural first reflecting surfaces 22A reflect light from the backlight 31 so as to propagate the light through the first cores 20A and cause the light incident into the first light receiving elements 4A. The third reflecting surfaces 23A reflects light going out of the first cores 20A and propagating through the clad 21 among the light reflected by the plural first reflecting surfaces 22A, toward a direction different from an axial direction of the first cores 20A, for example in an upward direction. In order to stably change an optical path of the light, metal films 24 and 25 are formed as optical path conversion surfaces in the first and third reflecting surfaces 22A and 23A, respectively. The metallic films 24 and 25 may be made of silver, a silver alloy, or the like, having a high reflectivity for light.

In addition, as shown in FIGS. 2 and 4, the optical waveguide 2 includes plural second reflecting surfaces 22B and plural fourth reflecting surfaces 23B. The plural second reflecting surfaces 22B are provided at the ends on the opposite side to the second light receiving elements 4B of the plural second cores 20B. The second reflecting surfaces 22B reflect light from the backlight 31 so as to propagate the light through the second cores 20B and cause the light to be incident into the second light receiving elements 4B. The fourth reflecting surfaces 23B reflect light going out of the second cores 20B and propagating through the clad 21 among the light reflected by the second reflecting surfaces 2213, toward a direction different from an axial direction of the second cores 20B, for example in an upward direction. Metallic films 24 and 25 made of silver, a silver alloy, or the like, are formed in the second and fourth reflecting surfaces 22B and 2313 as optical path conversion surfaces in order to stably change an optical path of the light.

A tilt angle of the first to fourth reflecting surfaces 22A, 22B, 23A and 23B may be 45° with respect to the axial direction of the cores 20A and 20B in order to introduce the light from the backlight 31 into the cores 20A and 20B efficiently. However, it may be 45°±5° because the light emitted from the backlight 31 is diffused light and because of a numerical aperture NA which can be confined in the cores 20A and 20B.

Figure 5:
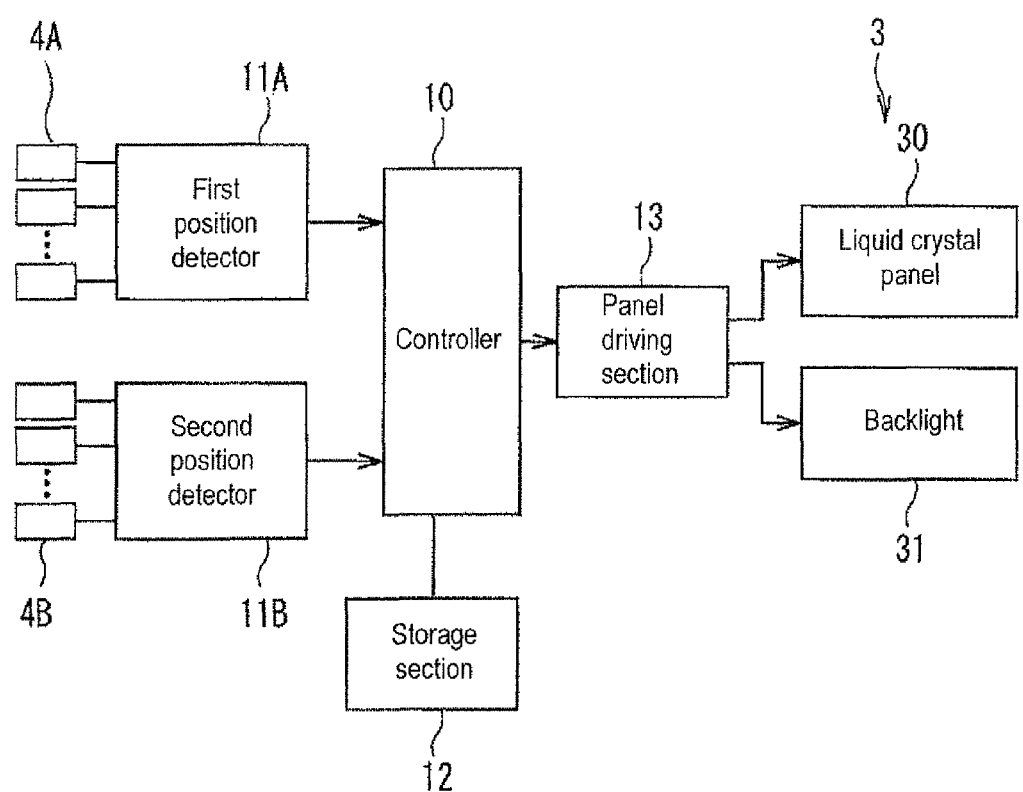
FIG. 5 is a block diagram showing a control system of the optical waveguide type touch panel.

FIG. 5 is a block diagram showing a control system of the optical waveguide type touch panel 1. The optical waveguide type touch panel 1 includes a controller 10 to control various parts of the touch panel 1. The controller 10 is connected to a first position detector 11A for detecting a pressing position in the axial direction of the first cores 20A based on output signals of the first light receiving elements 4A, a second position detector 11B for detecting a pressing position in the axial direction of the second cores 20B based on output signals of the second light receiving elements 4B, a storage section 12 for storing image data and the like, and a panel driving section 13 for driving the liquid crystal panel 30 and the backlight 31. The first and second position detectors 11A and 11B and the controller 10 may constitute a detecting unit for detecting a position where the first and second cores 20A and 20B are deformed by partially pressing the surface 2a.

When electrical signals output from the light receiving elements 4A and 4B are at a level less than a threshold value, the first and second position detectors 11A and 11B detect positions of the cores 20A and 20B corresponding to the light receiving elements 4A and 4B and output position detection signals to the controller 10.

The controller 10 detects a position of intersection between the cores 20A and 20B detected by the position detectors 11A and 11B, as a pressing position based on the position detection signals from the first and second position detectors 11A and 11B.

(Method of Manufacturing Optical Waveguide)

Figure 6A:
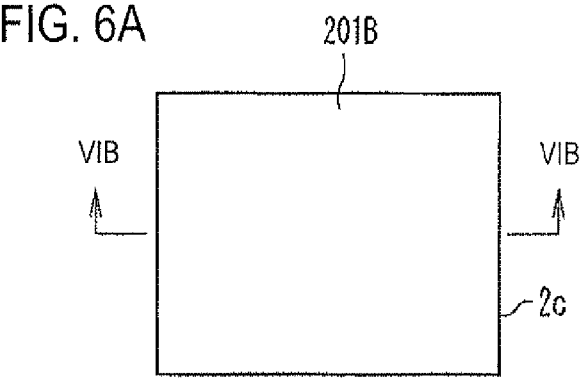
FIGS. 6A to 6J show an example process of manufacturing an optical waveguide 2.
Figure 6B:
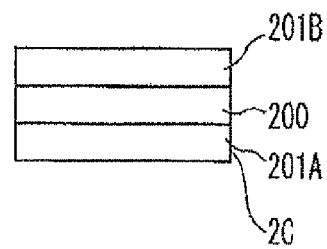
Figure 6C:
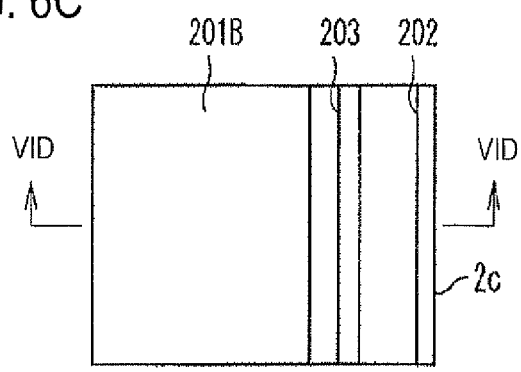
Figure 6D:
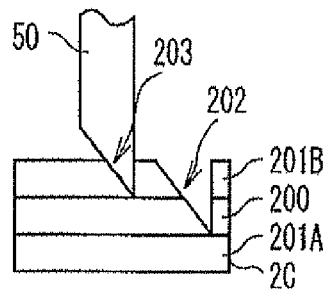
Figure 6E:
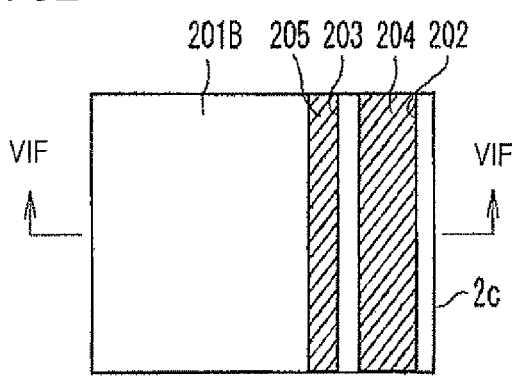
Figure 6F:
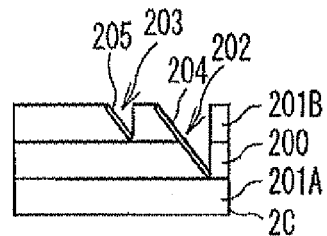
Figure 6G:
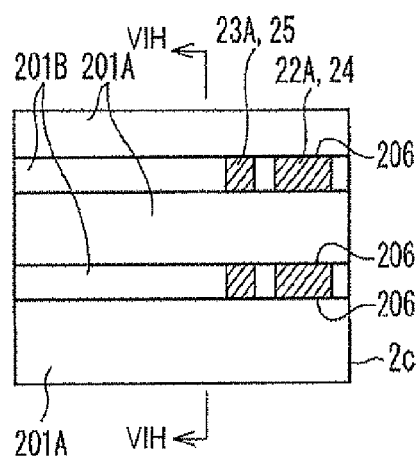
Figure 6H:
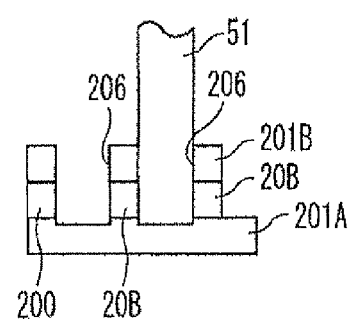
Figure 6I:
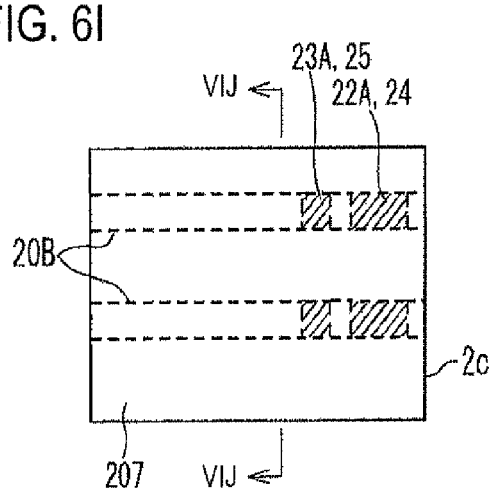
Figure 6J:
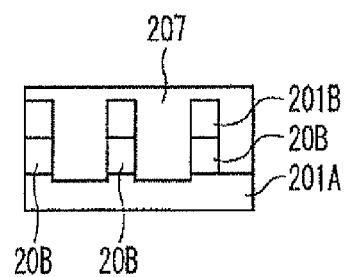

FIGS. 6A to 6J show an example process of manufacturing the optical waveguide 2. FIGS. 6A, 6C, 6E, 6G and 6I are plane views, FIG. 6B is a section view taken along a line VIB-VIB in FIG. 6A, FIG. 6D is a section view taken along a line VID-VID in FIG. 6C, FIG. 6F is a section view taken along a line VIF-VIF in FIG. 6E, FIG. 6H is a section view taken along a line VIH-VIH in FIG. 6G and FIG. 6J is a section view taken along a line VIJ-VIJ in FIG. 6I.

First, as shown in FIGS. 6A and 6B, a core layer 200 is formed on a first clad layer 201A, and a second clad layer 201B is formed on the core layer 200. These three layers 200, 201A and 201B are formed on a substrate by repeatedly performing spin coating, dipping, plating, or the like. In terms of continuous formation with high productivity, these stacks of layers may be formed by plating.

Next, as shown in FIGS. 6C and 6D, a first groove 202 having an inclined face and a vertical face is formed in parallel (or substantially parallel) to and near a side (end) 2c of the second clad layer 201B and the core layer 200 by means of a dicing blade 50 having a leading edge angle of 45°. Also, a second groove 203 having an inclined face and a vertical face is formed in parallel (or substantially parallel) to the first groove 202 on an inner side of the first groove 202 in the second clad layer 201B. Alternatively, the first and second grooves 202 and 203 may be V-shaped grooves.

Next, as shown in FIGS. 6E and 6F, a mask is closely adhered to the surface of the second clad layer 201B, and the metallic films 204 and 205 are attached to the inclined surface of the first and second grooves 202 and 203 using a film attachment device. The film attachment may be achieved by, for example, deposition, sputtering, etc., without particular limitation so long as the three layers 200, 201A and 201B are not damaged.

Next, as shown in FIGS. 6G and 6H, plural separation grooves 206 being perpendicular to the first groove 202 are formed in the second clad layer 201B and the core layer 200 using a diamond blade 51 whose leading edge has a rectangular section to form the plural cores 20B being perpendicular to the first groove 202.

Next, as shown in FIGS. 6I and 6J, the grooves 206 are filled with clad 207 made of the same material as the clad layers 201A and 201B, and then the clad material 207 is cured.

As a result, the lower portion of the optical waveguide 2 shown in FIG. 1 is formed. As described above, the optical waveguide 2 is manufactured by forming an upper portion of the optical waveguide 2 and attaching the lower portion and the upper portion of the optical waveguide 2 together.

Alternatively, after the lower portion of the optical waveguide 2 shown in FIG. 1 is formed as described above, the second core layer and a third clad layer may be formed on the lower portion of the optical waveguide 2. In addition, as described above, the first and second grooves are formed, a metallic film is formed on the inclined surface of the first and second grooves, and the first core 20A by the separation groove is formed.

(Operation of Optical Waveguide Type Touch Panel)

An operation of the optical waveguide type touch panel 1 will be described with reference to FIGS. 1 to 8.

Figure 7:
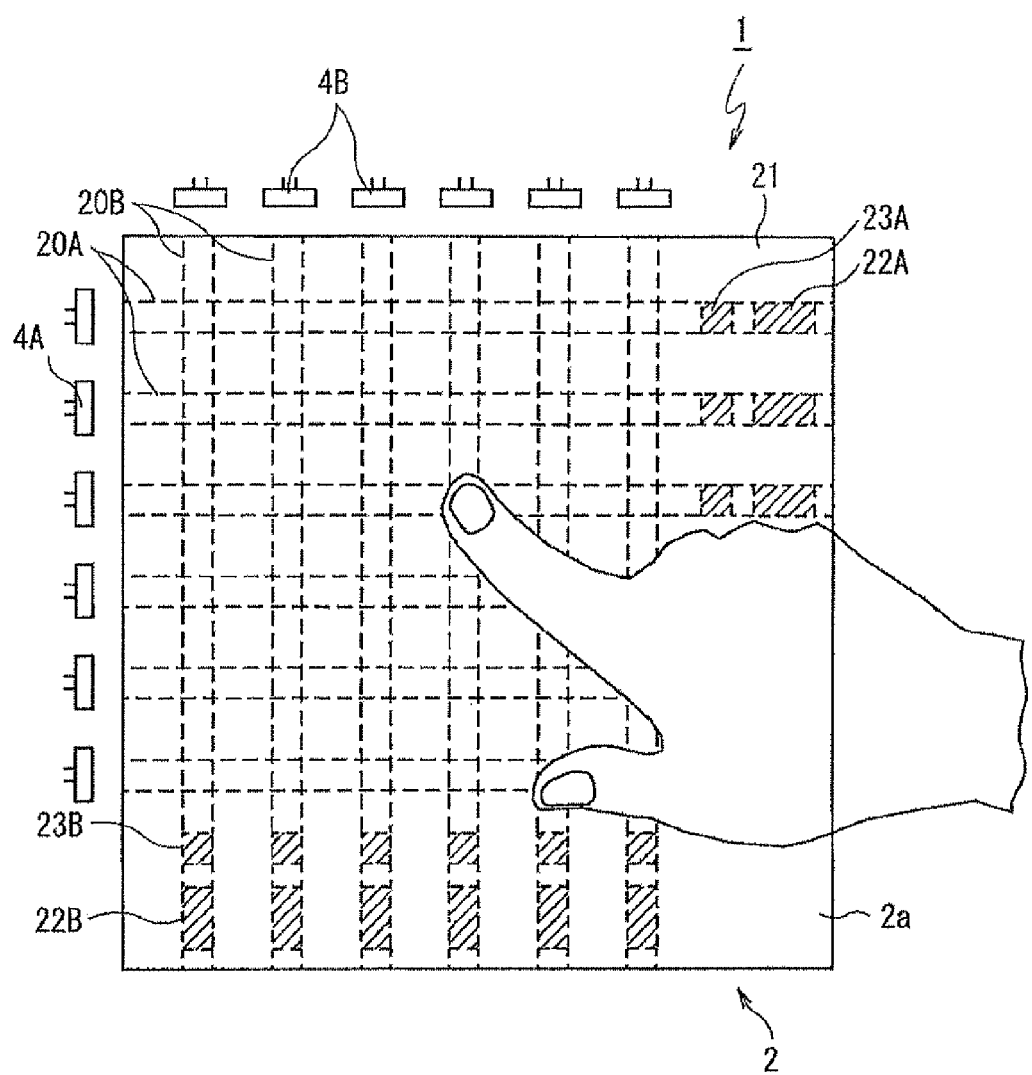
FIG. 7 is a plan view of a pressed optical waveguide type touch panel.
Figure 8A:
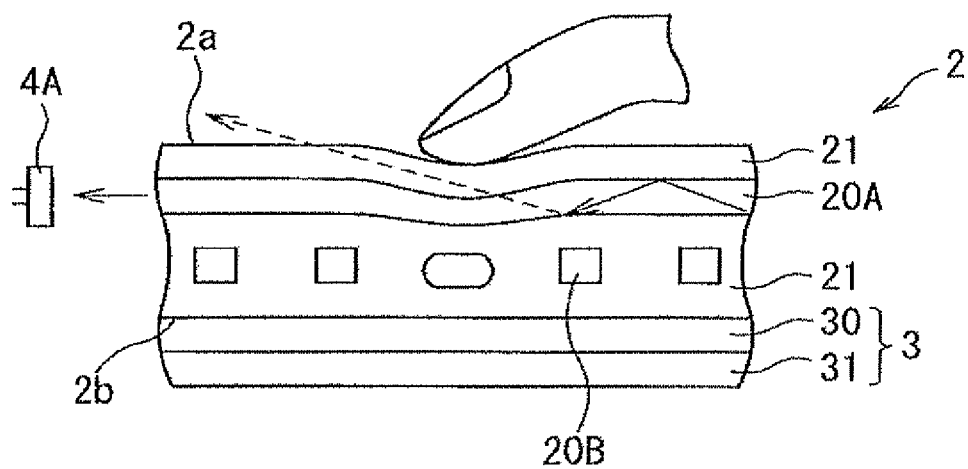
FIGS. 8A and 8B are sectional views of the main parts of the optical waveguide type touch panel at the pressing position shown in FIG. 7.
Figure 8B:
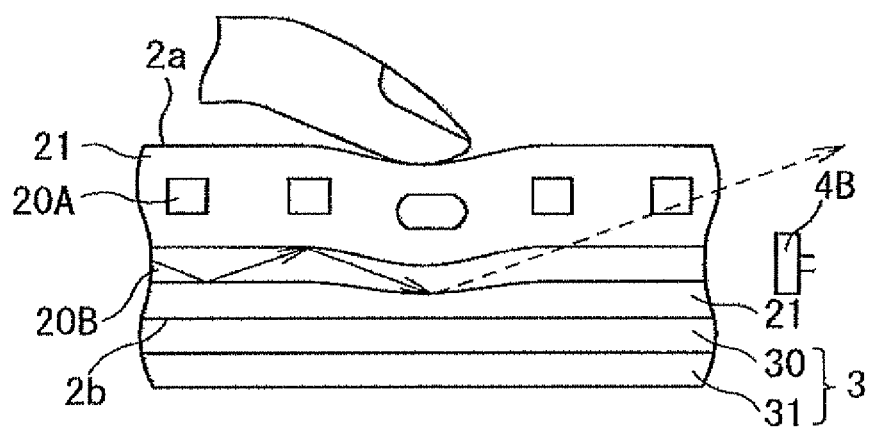

FIG. 7 is a plan view of a pressed optical waveguide type touch panel 1, and FIGS. 8A and 8B are sectional views of the main parts of the optical waveguide type touch panel 1 at the pressing position shown in FIG. 7.

The controller 10 controls the panel driving section 13 based on image data stored in the storage section 12. The panel driving section 13 transmits a driving signal to the liquid crystal panel 30 according to the image data, while turning the backlight 31 on. The liquid crystal panel 30 displays an image using light received from the backlight 31.

As shown in FIGS. 3 and 4, the light emitted from the backlight 31 passes through an opening 32a of a light shielding plate 32, is reflected by the first and second reflecting surfaces 22A and 22B, and propagates through the first and second cores 20A and 20B. The light propagating through the first and second cores 20A and 20B is incident into the first and second light receiving elements 4A and 4B. The first and second light receiving elements 4A and 4B output electrical signals of a level corresponding to the amount of received light, to the first and second position detectors 11A and 11B. The light receiving elements 4A and 4B, which receive the light propagating through the cores 20A and 20B located at positions being not pressed, output electrical signals of a level exceeding the threshold value.

In addition, as shown in FIGS. 3 and 4, while some of the light reflected by the first and second reflecting surfaces 22A and 22B propagates through the clad 21 out of the first and second cores 20A and 20B, it is reflected upwardly by the third and fourth reflecting surfaces 23A and 23B. Accordingly, the light propagating through the clad 21 can be prevented from being incident into the light receiving elements 4A and 4B as noise.

Since the optical waveguide 2 has flexibility, as shown in FIG. 7, when the front surface 2a of the optical waveguide 2 is pressed by, for example, a finger, a pen, or the like, the first and second cores 20A and 20B at the pressed position are deformed as shown in FIGS. 8A and 8B. As the first and second cores 20A and 20B are deformed, the light propagating through the first and second cores 20A and 20B leaks out of the cores 20A and 20B since light confinement in the pressed position is insufficient. The light receiving elements 4A and 4B, which receive light propagating through cores 20A and 20B at the pressed position, output electrical signals of a level less than the threshold value.

The first and second position detectors 11A and 11B detect corresponding positions of the cores 20A and 20B based on the first and second light receiving elements 4A and 4B, which output the electrical signal of the level less than the threshold value, and output position detection signals to the controller 10. The controller 10 detects a pressed position of the front surface 2a based on the position detection signals from the first and second position detectors 11A and 11B, and performs an operation corresponding to the pressed position.

Example 1

Hereinafter, examples of the present invention will be described in more detail. However, these examples do not limit the present invention.

First, ultraviolet-curable epoxy resin (having a reflective index of 1.587) is formed on a glass substrate using a spin coat method and is cured by ultraviolet irradiation to form the first clad layer 201A having thickness of 30 μm.

Next, ultraviolet-curable epoxy resin (having a reflective index of 1.590) is formed on the first clad layer 201A using a spin coat method and is cured by ultraviolet irradiation to form the core layer 200 having thickness of 50 μm.

Next, ultraviolet-curable epoxy resin (having a reflective index of 1.587) is formed on the core layer 200 using a spin coat method and is cured by ultraviolet irradiation to laminate the second clad layer 201B having thickness of 30 μm, thus manufacturing a three-layered sheet having total thickness of 110 μm.

Next, the dicing blade (manufactured by DISCO Corporation) 50, having a leading end angle of 45°, using diamond grains of granularity No. 5000 is mounted on a dicing saw (DAD321, manufactured by DISCO Corporation). The three-layered sheet is attached and fixed to the dicing saw by a dicing tape.

The dicing blade 50 having the leading end angle of 45° is lowered up to a depth of 80 μm from the outermost surface of the three-layered sheet and grinds the second clad layer 201B and the core layer 200 near one side of the three-layered sheet to form the first groove 202.

Next, the dicing blade 50 is moved by 120 μm in the direction of formation of an inclined surface, is lowered up to depth of 30 μm from the outermost surface of the three-layered sheet and grinds the second clad layer 201B of the three-layered sheet in parallel to the first formed groove 202 in order to form the second groove 203.

Next, a mask provided with an opening having a width of 180 μm is attached to the three-layered sheet, with two grinded inclined surfaces exposed from the opening and is mounted on a deposition film forming apparatus. A silver alloy material (No. 37 manufactured by Mitsubishi Materials Corporation) is loaded on the deposition film forming apparatus, and the metallic films 204 and 205 made of a silver alloy and having a thickness of 0.1 μm are formed on the two inclined surfaces by the deposition film forming apparatus.

Next, a dicing blade 51 having a width of 200 μm, whose leading end has a rectangular section, using diamond grains of granularity No. 3000, is mounted on the dicing saw. The dicing blade 51 is lowered up to a depth of 80 μm from the outermost surface of the three-layered sheet and performs a grinding process in a direction perpendicular to the two inclined surfaces formed to form the separation groove 206. After performing the grinding process in all grinding directions, the dicing blade 51 is moved by 250 μm and in parallel to a grinding process is performed to manufacture the second core 20B having its section of 50 μm×50 μm in the form of an array of an interval of 250 μm.

Next, the grinded separation groove 206 and the two grooves 202 and 203 formed with the silver alloy are filled with ultraviolet-curable epoxy resin (having a reflective index of 1.587) for clad, and this resin is cured by ultraviolet irradiation.

Next, ultraviolet-curable epoxy resin (having a reflective index of 1.590) for the core is formed and cured to form the core layer having thickness of 50 μm as described previously.

Next, ultraviolet-curable epoxy resin (having a reflective index of 1.587) for clad is formed and cured to form the clad layer having thickness of 30 μm as described previously, thus manufacturing a sheet having a total thickness of 190 μm.

Next, the dicing blade (manufactured by DISCO Corporation) 50, having a leading end angle of 45°, using diamond grains of granularity No. 5000 is mounted on the dicing saw (DAD321, manufactured by DISCO Corporation). The five-layered sheet having a total thickness of 190 μm is attached and fixed to the dicing saw by a dicing tape.

The dicing blade 50, having the leading end angle of 45°, is lowered up to a depth of 80 μm from the outermost surface of the five-layered sheet and the upper clad layer and the core layer near one side of the five-layered sheet in a direction perpendicular to the previously formed inclined surfaces is ground to form the first groove.

Next, the dicing blade 50 is moved by 120 μm in a direction of formation of the inclined surface, is lowered up to depth of 30 μm from the outermost surface of the five-layered sheet, and grinds the upper clad layer of one side of the five-layered sheet in parallel to the formed first groove to form the second groove.

Next, a mask provided with an opening having width of 180 μm is attached to the five-layered sheet, with two grinded inclined surfaces exposed from the opening and is mounted on a deposition film forming apparatus. A silver alloy material (No. 37 manufactured by Mitsubishi Materials Corporation) is loaded on the deposition film forming apparatus, and the metallic films made of a silver alloy and having a thickness of 0.1 μm are formed on the two inclined surfaces by the deposition film forming apparatus.

Next, the dicing blade 51 having a width of 200 μm, whose leading end has a rectangular section, using diamond grains of granularity No. 3000, is mounted on the dicing saw. The dicing blade 51 is lowered up to a depth of 80 μm from the outermost surface of the five-layered sheet and a grinding process in a direction perpendicular to the formed two inclined surfaces is performed to form the separation groove. After performing the grinding process in all grinding directions, the dicing blade is moved by 250 μm and in parallel to a grinding process is performed to manufacture the first core 20A having a section of 50 μm×50 μm in the form of an array of an interval of 250 μm. The first core 20A in the form of an array is arranged in a direction intersecting the previously formed second core 20B when viewed from the top.

Next, the ground separation groove and the two grooves formed with the silver alloy are filled with ultraviolet-curable epoxy resin (having a reflective index of 1.587) for clad, and this resin is cured by ultraviolet irradiation. Then, the glass substrate is detached, thus manufacturing an optical waveguide type touch panel. The hardness of the optical waveguide for touch panel is Hs40.

Next, a display 3 formed with a light shielding plate 32 having a plurality of openings 32a at a position opposite to the inclined surface, with a silver alloy formed thereon, of the optical waveguide type touch panel is prepared in two sides out of an image display range of the liquid crystal panel 30.

The position of the openings 32a on the light shielding plate 32 are aligned with the position of the inclined surface of the core having the silver alloy formed thereon in a direction normal to the front surface 2a.

Next, light receiving surfaces of the light receiving elements 4A and 4B (InGaAs photodiode manufactured by Kyosemi Corporation; having a light reception diameter of 50 μm) are loaded on the end of a side opposite to the inclined surface having the silver alloy formed thereon the cores 20A and 20B.

When the optical waveguide 2 attached to the display 3 and configured such that light emitted from the backlight 31 of the display 3 is detected by the light receiving elements 4A and 4B is pressed with pressure of 1 MPa, the insertion loss of the pressed cores 20A and 20B can be detected as increasing by 2 dB. The pressing position of the touch panel can be detected from the light receiving elements 4A and 4B which detect the insertion loss.

Other Exemplary Embodiments

The present invention is not limited to the above described exemplary embodiment but may be modified in various ways within the spirit and scope of the invention. For example, components of the embodiment may be combined or omitted at random within the spirit and scope of the invention. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical waveguide comprising:
    a clad that has a first surface and second surface which is opposed to the first surface, the clad being plate-like;
    a plurality of first cores that is provided in a first layer in the clad;
    a plurality of first reflecting surfaces each of which is provided in one end of a corresponding one of the first cores, each first reflecting surface that reflects light being incident from the second surface, so as to propagate the light through the first core; and
    a plurality of third reflecting surfaces each of which reflects light going out of a corresponding one of the first cores and propagating through the clad among the light reflected by the first reflecting surface, toward a direction different from an axial direction of the corresponding one of the first cores.

2. The optical waveguide according to claim 1, further comprising
    a plurality of second cores that is provided in a second layer in the clad, the second layer being different from the first layer, the second cores that intersect the first cores when viewed from the first surface;
    a plurality of second reflecting surfaces each of which is provided in one end of a corresponding one of the second cores, each second reflecting surface that reflects light being incident from the second surface, so as to propagate the light through the second core; and
    a plurality of fourth reflecting surfaces each of which reflects light going out of a corresponding one of the second cores and propagating through the clad among the light reflected by the second reflecting surface, toward a direction different from an axial direction of the corresponding one of the second cores.

3. The optical waveguide according to claim 1, wherein the optical waveguide has 40 or less in an Hs hardness, and the optical waveguide has a numerical aperture in a range of 0.01 to 0.2.

4. The optical waveguide according to claim 2, wherein the optical waveguide has 40 or less in an Hs hardness, and the optical waveguide has a numerical aperture in a range of 0.01 to 0.2.

5. An optical waveguide type touch panel comprising:
    an optical waveguide including a clad that has a first surface and a second surface which is opposed to the first surface, a plurality of first cores that is provided in a first layer in the clad, and a plurality of second cores that is provided in a second layer in the clad, the second layer being different from the first layer, the second cores that intersect the first cores when viewed from the first surface;
    a liquid crystal panel that is disposed at the second surface;
    a light source that irradiates the optical waveguide with light through the liquid crystal panel;
    a plurality of first light receiving elements each of which is disposed at one end of a corresponding one of the first cores of the optical waveguide;
    a plurality of second light receiving elements each of which is disposed at one end of a corresponding one of the second cores of the optical waveguide;
    a plurality of first reflecting surfaces that is provided in the other ends of the plurality of first cores, respectively, each first reflecting surface that reflects the light from the light source so as to propagate the light through the corresponding one of the first cores and cause the light to be incident into the corresponding one of the first light receiving elements;
    a plurality of second reflecting surfaces that is provided in the other ends of the plurality of second cores, respectively, each second reflecting surface that reflects the light from the light source so as to propagate the light through the corresponding one of the second cores and cause the light to be incident into the corresponding one of the second light receiving elements;
    a plurality of third reflecting surfaces each of which reflects light going out of a corresponding one of the first cores and propagating through the clad among the light reflected by the each first reflecting surface, toward a direction different from an axial direction of the corresponding one of the first cores;
    a plurality of fourth reflecting surfaces each of which reflects light going out of a corresponding one of the second cores and propagating through the clad among the light reflected by a corresponding one of the second reflecting surfaces, toward a direction different from an axial direction of the corresponding one of the second cores; and a detector that detects a position where the first and second cores are deformed by partially pressing the first surface, based on signals from the plurality of first and second light receiving elements.

6. The optical waveguide type touch panel according to claim 5, wherein the optical waveguide has 40 or less in Hs hardness, and the optical waveguide has a numerical aperture in a range of 0.01 to 0.2.

\* \* \* \* \*